United States Patent [19]

Miyamae et al.

[11] Patent Number: 5,659,525

[45] Date of Patent: Aug. 19, 1997

[54] OBJECTIVE LENS DRIVE UNIT HAVING SHAPED MAGNETIC PIECES FOR PROVIDING A RESTORING FORCE

[75] Inventors: Akira Miyamae; Hajime Kinoshita, both of Nagano, Japan

[73] Assignee: Kabushiki Kaisha Sankyo Seiki Seisakusho, Nagano, Japan

[21] Appl. No.: 322,418

[22] Filed: Oct. 13, 1994

[30] Foreign Application Priority Data

| Oct. 13, 1993 | [JP] | Japan | 5-280215 |
| Oct. 21, 1993 | [JP] | Japan | 5-285655 |
| Oct. 29, 1993 | [JP] | Japan | 5-294078 |

[51] Int. Cl.$^6$ .............. G02B 7/02; G11B 21/10
[52] U.S. Cl. .............. 369/44.22; 369/219; 359/814; 359/824
[58] Field of Search .............. 369/219, 44.15, 369/44.22, 221; 359/814, 824, 823

[56] References Cited

U.S. PATENT DOCUMENTS

| 4,790,628 | 12/1988 | Nanno et al. | 369/44.22 |
| 4,998,802 | 3/1991 | Kasuga et al. | 369/44.22 |
| 5,073,882 | 12/1991 | Sasaki | 359/814 |
| 5,191,484 | 3/1993 | Yeon et al. | 369/44.14 |

FOREIGN PATENT DOCUMENTS 62-109240  5/1987  Japan.

*Primary Examiner*—Robert S. Tupper
*Assistant Examiner*—Kevin M. Watkins
*Attorney, Agent, or Firm*—Sughrue, Mion, Zinn, Macpeak & Seas

[57] ABSTRACT

An objective lens drive device includes an objective lens holder, a fixing member, drive coils mounted on one of the objective lens holder and the fixing member; magnets mounted on the other, the magnets positioned in a face-to-face relationship with the drive coils and supplied with an electric current so as to drive the lens holder in both a focusing and a tracking direction, the magnets are magnetized with polarization at least in the focusing direction; and magnetic pieces placed in the magnetic circuits of the magnets relating to a focusing direction, wherein a two-dimensional restoring force is generated in the focusing and tracking directions by the magnetic attraction acting on the magnetic pieces so that the objective lens is held at the neutral point, at least one end portion of the magnetic pieces in the polarizing direction is wider than the middle portion.

4 Claims, 9 Drawing Sheets

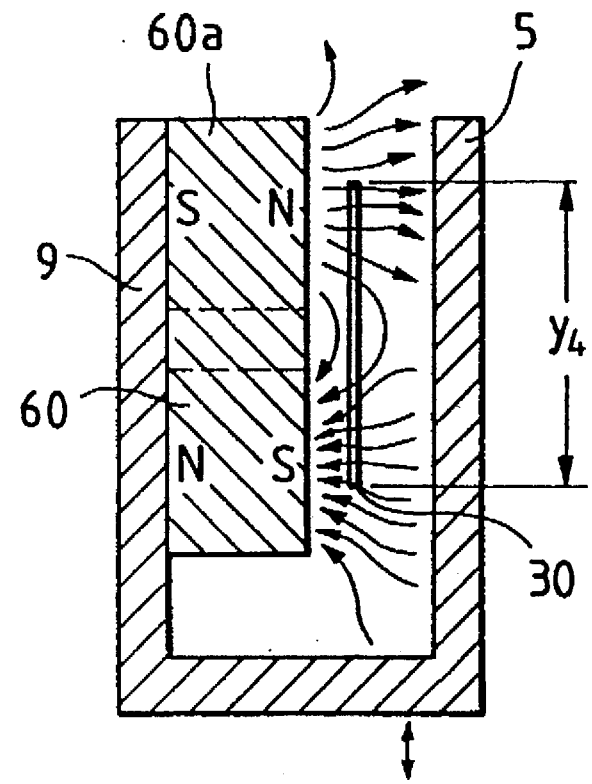
FIG. 22
PRIOR ART
FIG. 23
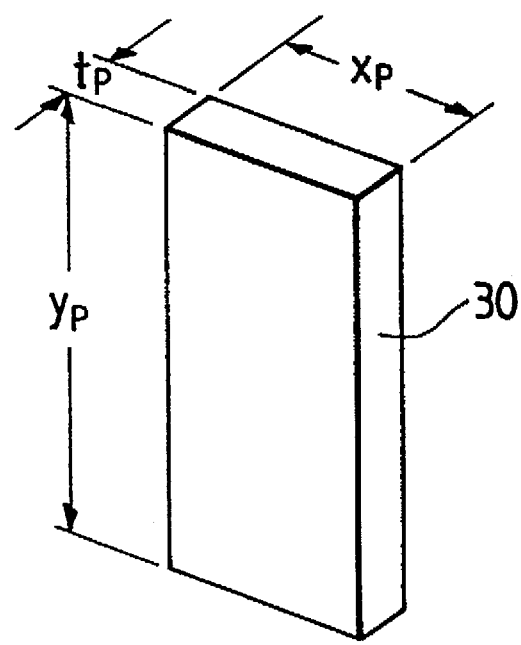

OBJECTIVE LENS DRIVE UNIT HAVING SHAPED MAGNETIC PIECES FOR PROVIDING A RESTORING FORCE

BACKGROUND OF THE INVENTION

1. Field of Industrial Utility

The present invention relates to an objective lens drive unit.

2. Related Art

With optical disk systems that use optical disks as recording media, an optical pickup is used to write information signals onto the optical disk and to read them from the disk. The optical pickup uses an objective lens drive unit for allowing the laser beam to converge correctly in individual information pits on the optical disk. With the objective lens drive unit, it is necessary that the objective lens be subjected to precise position control two-dimensionally in both a focusing and a tracking direction. To insure that this two-dimensional following servo is performed in a precise manner, a construction for holding the objective lens at a specified neutral point (the stationary neutral position) is an important element that determines the performance of the optical pickup.

One of the means that have been proposed to hold the objective lens at the specified neutral point is by providing a magnetic restoring force, as described in Unexamined Published Japanese Utility Model Applications (kokai) Sho 58-179635, Sho 58-163908, Unexamined Published Japanese Patent Application (kokai) Sho 62-141646 or the like.

The objective lens drive units described in these patents that are designed to provide a magnetic restoring force have had the problem that they are limited in the range over which magnetic restoring forces can be created and that some improvement is necessary such as the use of more than one magnetic piece. Another problem is that one magnetic piece is capable of holding the objective lens at the neutral point in either a focusing or a tracking direction and that in order to insure that the objective lens is held in both focusing and tracking directions, a two-phase magnetic piece is necessary, which will increase the complexity of the structural design and the cost of the equipment.

With a view to solving these problems, the objective lens drive unit described in Unexamined Published Japanese Patent Application Hei 1-317234 has magnets mounted in a face-to-face relationship with drive coils and the magnets are magnetized with polarization in a certain direction, say, a focusing direction. One magnetic piece in the form of a vertically elongated thin sheet as indicated by 30 in FIG. 23 is placed within the magnetic circuit of each of said focusing magnet portions and a two-dimensional restoring force is generated in both the focusing direction and a tracking direction by the magnetic attraction acting on the magnetic piece 30, so that the objective lens is held at the neutral point.

Using a magnetic piece 30 with a width (xp) of 0.8 mm and a length (yp) of 4.6 mm, the inventors measured the resonant frequency fo of the moving part in the focusing direction (to be hereinafter referred to as "focusing fo") and the resonant frequency fo of the moving part in the tracking direction (to be hereinafter referred to as "tracking fo"). The results were as follows: focusing fo=26.6 Hz; tracking fo=17.0 Hz. With compact disks (CDs) and the like, the values of focusing fo and tracking fo are typically around 20 to 30 Hz. Further, their values depend on the width (xp), length (yp) and thickness (tp) of the magnetic piece 30 and optimal values of resonant frequency (fo) can be attained by properly varying those dimensions.

With recent models of CD-ROM and other optical disk systems that are capable of operation in a quick mode 2 to 4 times as fast as in the normal mode, a growing need has arisen to increase the tracking fo while suppressing the changes in the focusing fo. However, the magnetic piece 30 is provided within the magnetic circuit of each of the focusing magnets and if its shape is varied by changing its width (xp) or length (yp) or thickness (tp), not only the tracking fo but also the focusing fo will change, thus failing to meet the need for increasing the tracking fo while suppressing the changes in the focusing fo.

A further problem is that in order to increase the tracking fo without changing the shape of the magnetic piece 30, its length yp must be increased but then the magnetic circuit of the focusing magnet portion is upset to degrade the linearity of its characteristics. There has also been the problem that the thickness of the optical pickup increases to such a level that it is no longer compact.

The objective lens drive unit described in Unexamined Published Japanese Patent Application (kokai) Hei 1-317234, supra, has had the following additional but serious problem. In a structure that allows the magnetic piece to be moved relative to a fixed magnet, the converging position of the magnetic piece in the tracking direction (which is generally referred to as the "stationary neutral position") is positioned to lie in a face-to-face relationship with the design neutral position of the magnet where the highest flux density is achieved (which coincides with the position of the middle portion in the peripheral direction) so that the magnetic attraction acting on the magnetic piece will be maximal in that position, thereby insuring that the objective lens is held in a stable manner. In practice, however, imbalanced flux, leakage flux, variations in workmanship and other factors make it difficult for the magnetic piece to be held stable in the design neutral position.

Namely, when the magnetic piece is placed in the position which is shifted from the designed neutral position, the center of the objective lens is shifted from the optical beam under the rest condition. This causes to the shape of the optical beam spot to buckle. Moreover, in the rest condition, it is impossible to obtain the information from the optical disk although the information from the optical disk is obtained in the normal condition. This becomes the problem in the productivity.

Moreover, in the consideration of the characteristic of the actuator of the objective lens drive unit, the neutral position is designed. However, in the shifted condition described above, the magnet pieces are tilted in one side. In the tilted side, the area where the drive unit is driven in the stable condition is limited.

This problem is significant not only in the tracking direction but also in the focusing direction.

SUMMARY OF THE INVENTION

An object, therefore, of the present invention is to provide an objective lens unit that is capable of increasing the tracking fo while maintaining the linearity of its characteristics at a satisfactory level and which yet can be manufactured in a smaller thickness.

Another object of the invention is to provide an objective lens unit that is capable of increasing the tracking fo while suppressing the changes in the focusing fo.

A further object of the invention is to provide an objective lens unit that is capable of not only allowing an objective lens to rest stably in the design neutral position but also increasing the tracking fo while suppressing the changes in the focusing fo.

In one aspect of the present invention, there is provided an objective lens drive device comprising: an objective lens holder; a fixing member; drive coils mounted on one of the objective lens holder and the fixing member; magnets mounted on the other, the magnets positioned in a face-to-face relationship with the drive coils and supplied with an electric current so as to drive the lens holder in both a focusing and a tracking direction, the magnets are magnetized with polarization at least in the focusing direction; and magnetic pieces placed in the magnetic circuits of the magnets relating to a focusing direction, wherein a two-dimensional restoring force is generated in the focusing and tracking directions by the magnetic attraction acting on the magnetic pieces so that the objective lens is held at the neutral point, at least one end portion of the magnetic pieces in the polarizing direction is wider than the middle portion.

In another aspect of the present invention, there is provided an objective lens drive device comprising: an objective lens holder; a fixing member; drive coils mounted on one of the objective lens holder and the fixing member; magnets mounted on the other, the magnets positioned in a face-to-face relationship with the drive coils and supplied with an electric current so as to drive the lens holder in both a focusing and a tracking direction, the magnets are magnetized with polarization at least in the focusing direction; and magnetic pieces placed in the magnetic circuits of the magnets relating to a focusing direction, wherein a two-dimensional restoring force is generated in the focusing and tracking directions by the magnetic attraction acting on the magnetic pieces so that the objective lens is held at the neutral point, at least one end portion of the magnetic pieces in the polarizing direction is thicker than the middle portion.

In another aspect of the present invention, there is provided an objective lens drive device comprising: an objective lens holder; a fixing member; drive coils mounted on one of the objective lens holder and the fixing member; magnets mounted on the other, the magnets positioned in a face-to-face relationship with the drive coils and supplied with an electric current so as to drive the lens holder in both a focusing and a tracking direction, the magnets are magnetized with polarization at least in the focusing direction; and magnetic pieces placed in the magnetic circuits of the magnets relating to a focusing direction, wherein a two-dimensional restoring force is generated in the focusing and tracking directions by the magnetic attraction acting on the magnetic pieces so that the objective lens is held at the neutral point, the magnetic pieces are mounted in such a manner that two pieces are spaced apart in a direction perpendicular to the direction in which the focusing magnets are magnetized with polarization.

In another aspect of the present invention, there is provided an objective lens drive device comprising: an objective lens holder; a fixing member; drive coils mounted on one of the objective lens holder and the fixing member; magnets mounted on the other, the magnets positioned in a face-to-face relationship with the drive coils and supplied with an electric current so as to drive the lens holder in both a focusing and a tracking direction, the magnets are magnetized with polarization at least in the focusing direction; and magnetic pieces placed in the magnetic circuits of the magnets relating to a focusing direction, wherein a two-dimensional restoring force is generated in the focusing and tracking directions by the magnetic attraction acting on the magnetic pieces so that the objective lens is held at the neutral point, a distance from the magnetic pieces to the magnets is the closest in the design stationary neutral position.

In another aspect of the present invntion, there is provided an objective lens drive device comprising: an objective lens holder; a fixing member; drive coils mounted on one of the objective lens holder and the fixing member; magnets mounted on the other, the magnets positioned in a face-to-face relationship with the drive coils and supplied with an electric current so as to drive the lens holder in both a focusing and a tracking direction, the magnets are magnetized with polarization at least in the focusing direction; and magnetic pieces placed in the magnetic circuits of the magnets relating to a focusing direction, wherein a two-dimensional restoring force is generated in the focusing and tracking directions by the magnetic attraction acting on the magnetic pieces so that the objective lens is held at the neutral point, a distance from the magnetic pieces to the magnets is the closest in the design stationary neutral position.

In the objective lens drive unit according the present invention, at least one end portion of the magnetic piece in the polarizing direction is adjusted to have a greater width than the central portion and, as a result, the flux through the magnetic piece that will contribute to the production of a restoring force in the focusing direction is suppressed by the constricted central portion whereas the volume of the magnetic piece that will contribute to the production of a restoring force in the tracking direction is increased. This permits the tracking fo to be increased with the length of the magnetic piece being adjusted to be equal to or smaller than the conventional value. Hence, the objective lens drive unit of the first embodiment is capable of increasing the tracking fo while maintaining the linearity of its characteristics at a satisfactory level and yet it can be manufactured in a smaller thickness.

According to the present invention, at least one end portion of the magnetic piece in the polarizing direction is adjusted to have a greater thickness than the central portion and, hence, as in the first embodiment, the objective lens drive unit is capable of increasing the tracking fo while maintaining the linearity of its characteristics at a satisfactory level and yet it can be manufactured in a smaller thickness.

According to the present invention, two magnetic pieces are spaced apart in a direction perpendicular to the direction in which the focusing magnet portion is magnetized with polarization and, hence, the changes in the focusing fo are suppressed and yet the tracking fo can be enhanced. This makes it possible to meet the need for increasing the tracking fo while suppressing the changes in the focusing fo, which is the requirement of recent models of CD-ROM and other optical disk systems which are capable of operation in a quick mode 2 to 4 times as fast as in the normal mode.

According to the present invention, the position where the distance between the magnetic piece ad the magnet is the closest coincides with the design neutral point; therefore, in that position, the magnetic attraction working on the magnetic piece is great enough to insure that the adverse effects of imbalanced flux, leakage flux, variations in workmanship and other factors can be safely neglected and this permits the objective lens to rest stably in that position.

If the distance to the magnetic piece is made the shortest in the central part of the magnet in the peripheral direction, this offers the added advantage of allowing the flux density from the magnet to be concentrated in the middle part, thereby making it possible to increase the tracking fo while suppressing the changes in the focusing fo.

BRIEF DESCRIPTION OF THE DRAWINGS

FIG. 22 is a longitudinal section showing the essential part of the objective lens drive unit of the fourth embodiment together with the flux distribution from the magnetic piece portion; and FIG. 23 is a perspective view of a magnetic piece used in a conventional art objective lens drive unit.

DETAILED DESCRIPTION OF THE PREFERRED EMBODIMENTS

First embodiment

Figure 1:
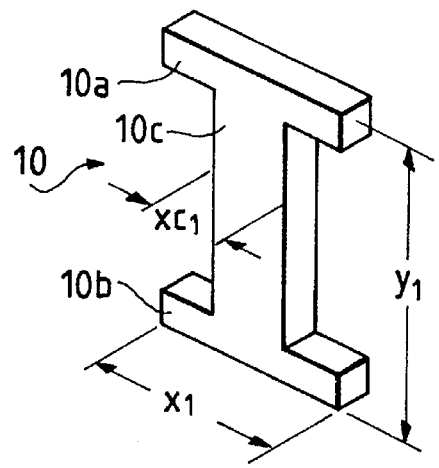
FIG. 1 is a perspective view of a magnetic piece as applied to the objective lens drive unit according to the first embodiment of the invention.
Figure 2:
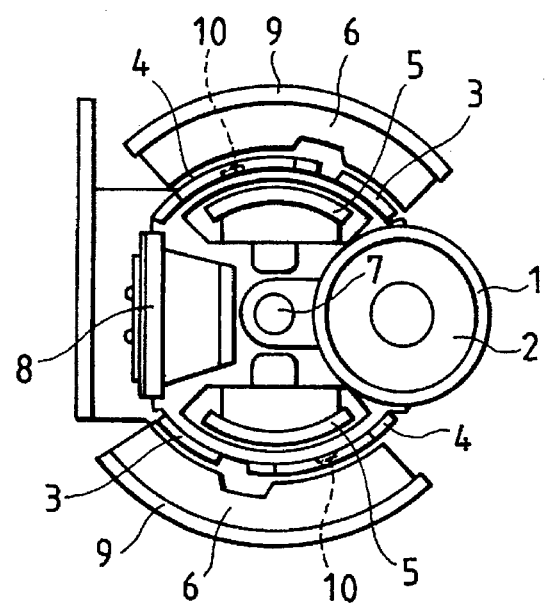
FIG. 2 is a plan view of the objective lens drive unit.
Figure 3:
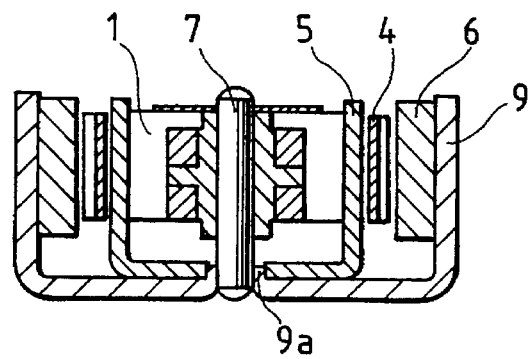
FIG. 3 is a longitudinal section of FIG. 2.
Figure 4:
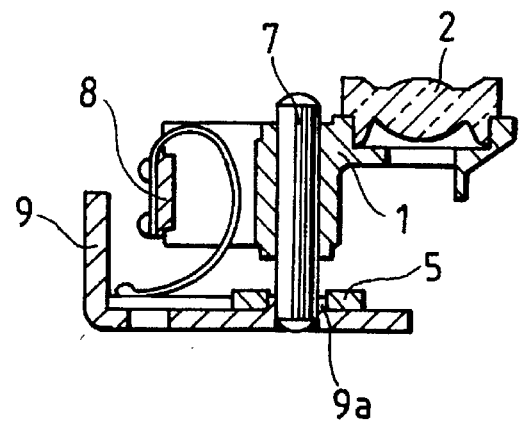
FIG. 4 is a longitudinal section of the objective lens portion.
Figure 5:
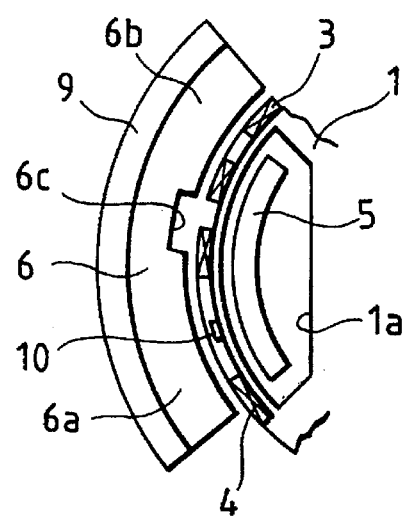
FIG. 5 is a plan view showing enlarged the magnet and coil portions.

A first embodiment of the invention is described below with reference to accompanying drawings. FIG. 1 is a perspective view of a magnetic piece as applied to the objective lens drive unit of the first embodiment. In FIG. 1, two end portions 10a and 10b of the magnetic piece 10 in the polarizing direction has a greater width x1 than the middle portion 10c with a width of xc1.

The objective lens drive unit according to the first embodiment of the invention will now be described in detail.

Shown by 1 in FIGS. 2 to 5 is a lens holder that is supported in such a way that it is rotatable about a fixed shaft 7 and movable along the shaft 7. An objective lens 2 is furnished with an objective lens 2 in such a way that its optical axis is parallel to the shaft 7. The lens holder 1 has a balancer 8 secured on the side opposite to the objective lens 2 with the shaft 7 lying intermediate between the two members. The lens holder 1 has a pair of focusing drive coils 4 secured to its circumferential surface in symmetrical positions with respect to the shaft 7 and this is also true with a pair of tracking drive coils 3. The circumferential surface of the lens holder 1 to which the focusing drive coils 4 and the tracking drive coils 3 are secured draws common continuous arcs of circles having the shaft 7 at the center and the coils 4 and 3 are bent along these arcuate surfaces to be secured to the lens holder 1.

Figure 6:
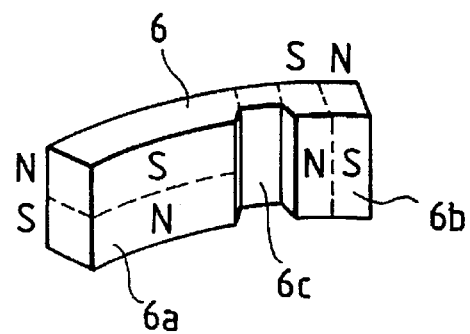
FIG. 6 is a perspective view of the magnet.

The shaft 7 is pressed into, bonded to or otherwise fixed in a boss 9a that has been formed by burring the center of an outer yoke 9 which serves as a fixing member. The outer yoke 9 is formed as a sector on both sides with the shaft 7 lying in the middle; the outer peripheral portion of the sector is bent up at a right angle in a face-to-face relationship with the coils 4 and 3. The rising portions of the outer yoke 9 are formed along arcs of a circle having the shaft 7 at the center, and arcuate magnets 6 are fixed to the inner surfaces of the rising portions. The magnets 6 are molded as integral parts by a suitable means such as a resin binder. As shown in FIG. 6, each magnet 6 has a groove 6c formed in the middle in a direction parallel to the shaft 7 and consists of a focusing magnet portion 6a and a tracking magnet portion 6b that are formed on opposite sides of the groove 6c. The focusing magnet portion 6a is magnetized with polarization in such a way that N and S poles are formed along the shaft 7 whereas the tracking magnet portion 6b is magnetized with polarization in a direction perpendicular to the magnetizing direction of the focusing magnet portion 6a so that N and S poles are formed in a peripheral direction. Being thusly formed as an integral part, the magnet portions 6a and 6b are mounted on a continuous common surface.

Figure 7:
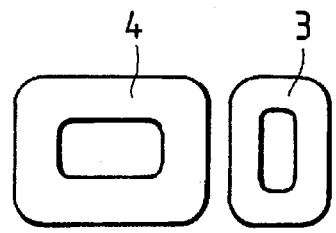
FIG. 7 is a front view of the coils.

As shown in FIG. 7, each focusing drive coil 4 is formed as a rectangle that is mounted in such a way that the longer sides face the respective magnetic poles of the focusing magnet portion 6a. Each tracking drive coil 3 is also formed as a rectangle but it is mounted in such a way that the longer sides face the respective magnetic poles of the tracking magnet portion 6b.

An inner yoke 5 is placed on top of the outer yoke 9 and secured as referenced to the outside diameter of the boss 9a. Like the outer yoke 9, the inner yoke 5 is formed as a sector on both sides with the shaft 7 lying at the center and the outer peripheral portion of the sector is bent up at a right angle. The rising portions of the inner yoke 5 are formed along arcs of a circle having the shaft 7 at the center. The rising portions penetrate, with good spatial clearance, through windows 1a formed in the top of the lens holder 1 and each of them faces the magnet portions 6a and 6b with the coils 4 and 3 being interposed. Thus, the inner yoke 5, drive coils 3 and 4, magnets 6 and the outer yoke 9 are arranged on arcs of circles having the shaft 7 at the center and with the inner yoke 5 positioned the innermost (the closest to the shaft 7), thereby forming substantially closed magnetic paths that pass through these members.

Figure 8:
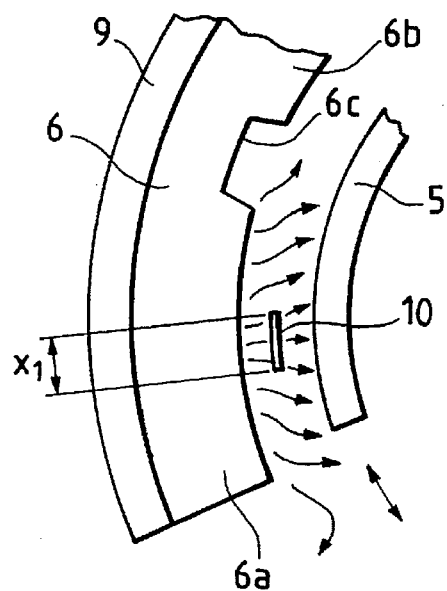
FIG. 8 is a plan view showing the essential part of the objective lens drive unit together with the flux distribution from the magnetic piece portion.
Figure 9:
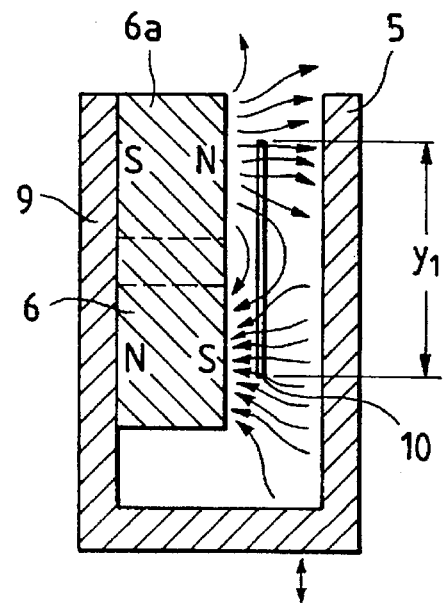
FIG. 9 is a longitudinal section showing the essential part of the objective lens drive unit together with the flux distribution from the magnetic piece portion.

The outer peripheral portion of each sector of the lens holder 1 has a magnetic piece 10 secured in a position that faces the magnetic pole center of the focusing magnet portion 6a. The magnetic piece 10 is the characteristic part of the first embodiment of the present invention and, as shown in FIGS. 8 and 9, it is in the form of a thin sheet, with x1 (the width along the circumference of a circle having the shaft 7 at the center) being much smaller than the circumferential dimension of the focusing magnet portion 6a and with y1 (the length along the shaft 7) being also smaller than the axial dimension of the focusing magnet portion 6a. Further, as shown in FIG. 1, two opposite end portions 10a and 10b of the magnetic piece 10 in the vertical direction (the polarizing direction) each have a greater width x1 than the middle portion 10c whose width is xc1.

In a typical case, x1=1.6 mm, xc1=0.7 mm and y1=4.4 mm.

The objective lens drive unit of the first embodiment is operated in the following manner. Let us first describe the basic principles of focusing and tracking operations. When a drive current is supplied through the focusing drive coils 4, the applied current and the flux within the magnetic circuits combine to generate a thrust that causes the lens holder 1 and the objective lens 2 to be moved simultaneously along the optical axis for effecting a focusing operation. When a drive current is supplied through the tracking drive coils 3, the applied current and the flux within the magnetic circuits combine to generate a thrust that causes the lens holder 1 and the objective lens 2 to be moved simultaneously in the tracking direction for effecting a tracking operation.

We next describe the relationship between the flux generated by the focusing magnet portion 6a and the magnetic piece 10. The focusing magnet portion 6a is magnetized with polarization along the shaft 7. In a plane that crosses the shaft 7 at right angles, the flux is maximal in the middle part of the gap in the peripheral direction and decreases progressively as it approaches either end of the gap (see FIG. 8). Since the magnetic piece 10 is placed within the gap, it is subjected not only to the magnetic attraction created by the focusing magnet portion 6a but also to a restoring force that is comparable to the elastic recovery that will provide a stably holding action at the above-described point where the maximum flux occurs. This restoring force allows the lens holder 1 to be held at the peripheral neutral point, whereby the objective lens 2 is held at the neutral point in the tracking direction. The restoring force is proportional to the gradient of the flux distribution and the area of the magnetic piece 10. When the range over which the objective lens 2 can typically move in the tracking direction is considered, the change in the gradient of flux distribution can be approximated by linearity and, hence, the restoring force of interest is created substantially uniformly over the typical moving range of the objective lens 2.

On the other hand, in a section taken along the shaft 7, the focusing magnet portion 6a is magnetized with polarization in the axial direction and, hence, the gradient of flux distribution within the gap containing the magnetic piece 10 is reversed halfway the path in the vertical direction (see FIG. 9). In the case under consideration, the magnetic piece 10 works as part of the magnetic path and is magnetically attracted by the central portion of the area magnetized with polarization. This attraction acts as a restoring force that allows the lens holder 1 to be held in a specified position along the shaft 7, whereby the objective lens 2 is held at the neutral point in the focusing direction. As mentioned just above, the magnetic piece 10 serves as part of the magnetic path of the flux flowing out of the focusing magnetic portion 6a and this offers an added advantage in that the flux density improves, thereby contributing to a higher sensitivity of the objective lens drive unit while insuring that the magnetic restoring force is produced consistently over a wide range.

The present inventors conducted an experiment with the objective lens drive unit of the first embodiment to measure the focusing fo and tracking fo and the results were as follows: focusing fo=19.4 Hz (formerly 26.6 Hz); tracking fo=21.6 Hz (formerly 17.0 Hz).

Thus, in the first embodiment where x1, the width of each of the end portions 10a and 10b of the magnetic piece 10 in the polarizing direction, was adjusted to be greater than xc1, the width of the central portion 10c (1.6 mm>0.7 mm), the flux through the magnetic piece 10 that will contribute to the production of a restoring force in the focusing direction is suppressed by the constricted central portion whereas the volume of the magnetic piece that will contribute to the production of a restoring force in the tracking direction is increased. Hence, the tracking fo can be increased even if y1, the length of magnetic piece 10, is adjusted to be smaller than it has been in the conventional art (4.4 mm<4.6 mm).

Therefore, the objective lens drive unit under consideration is capable of increasing the tracking fo while maintaining the linearity of its characteristics at a satisfactory level and it yet can be manufactured in a smaller thickness.

It should be mentioned that similar effects can be attained even if y1, the length of the magnetic piece 10, is adjusted to be equal to the conventional value (4.6 mm).

It should also be noted that in the first embodiment of the invention, the increase in the tracking fo can be accompanied by the decrease in the focusing fo and, hence, it is possible to satisfy the need for the two requirements.

If the width of the magnetic piece 10 is increased with its relative dimensions being kept as such, both the focusing fo and the tracking fo can be further increased to about 25 Hz, making it possible to insure that both resonant frequencies are set at intermediate values in the range 20 to 30 Hz which is required for CDs and other optical disk systems.

It should further be added that the tracking fo can be increased to 30 to 40 Hz by changing the dimensions of details of the magnetic piece 10.

Second embodiment

Figure 10:
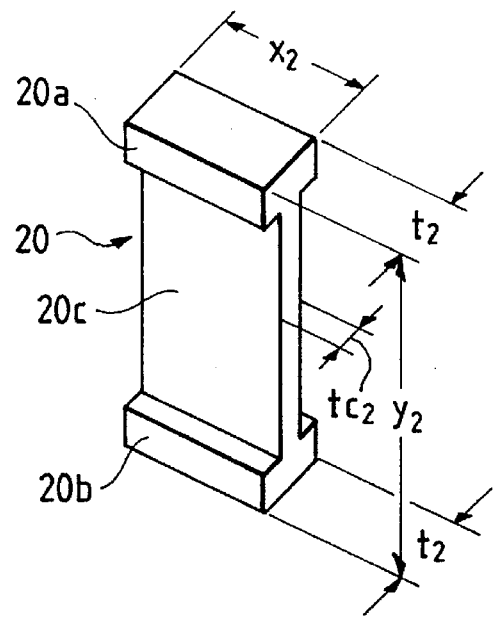
FIG. 10 is a perspective view of a magnetic piece as applied to the objective lens drive unit according to the second embodiment of the invention.

FIG. 10 is a perspective view of a magnetic piece as applied to the objective lens drive unit of a second embodiment of the invention. The magnetic piece in the second embodiment which is indicated by 20 in FIG. 10 differs from the magnetic piece 10 in the first embodiment in that both end portions 20a and 20b in the polarizing direction have a greater thickness t2 than the central portion 20c whose thickness is tc2.

Even with this design, the flux through the magnetic piece 20 that will contribute to the production of a restoring force in the focusing direction is suppressed by the constricted central portion whereas the volume of the magnetic piece that will contribute to the production of a restoring force in the tracking direction is increased, thereby yielding the same result as in the first embodiment.

While the present invention has been described above specifically with reference to the first and second embodiments, it should of course be understood that the invention is by no means limited to those particular embodiments but can be modified in various manners without departing from the scope and spirit of the invention. Both end portions of the magnetic piece in the polarizing direction are rendered to have a greater width (in the first embodiment) or thickness (in the second embodiment) than the central portion. Similar results can be attained even if only one end portion (either the upper end or lower end portion) is adjusted to have a greater width or thickness than the central portion.

Third embodiment

Figure 11:
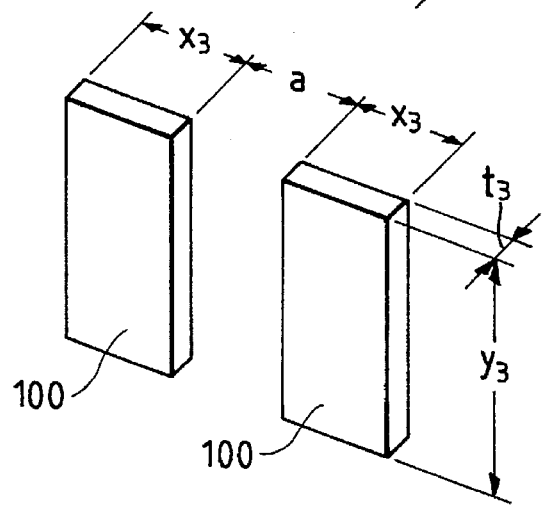
FIG. 11 is a perspective view of magnetic pieces as applied to the objective lens drive unit according to the third embodiment of the invention.

A third embodiment of the present invention is described below with reference to accompanying drawings. FIG. 11 is a perspective view of a magnetic piece as applied to the objective lens drive unit of the third embodiment.

The objective lens drive unit in the third embodiment is characterized in that two magnetic pieces are provided within the magnetic circuit formed by the focusing magnet portion 6a shown in FIG. 6 and that two such magnetic pieces 100 are spaced apart by a given distance a in a direction (from left to right as seen in FIG. 11) that is perpendicular to the direction in which the focusing magnet portion 6a is magnetized with polarization.

The objective lens drive unit according to the third embodiment will now be described in greater detail except for the components other than the two magnetic pieces 100 that are in no way different than in the objective lens drive unit of the first embodiment. In the following description, the same components as in the first embodiment are identified by like numerals.

Figure 12:
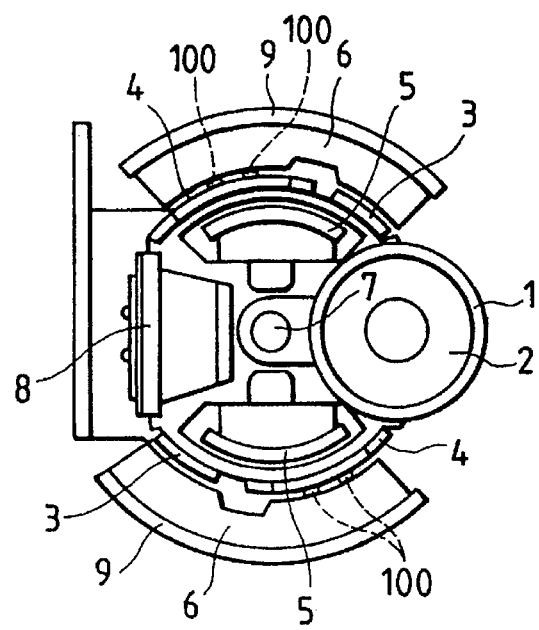
FIG. 12 is a plan view of the objective lens drive unit of the third embodiment.
Figure 13:
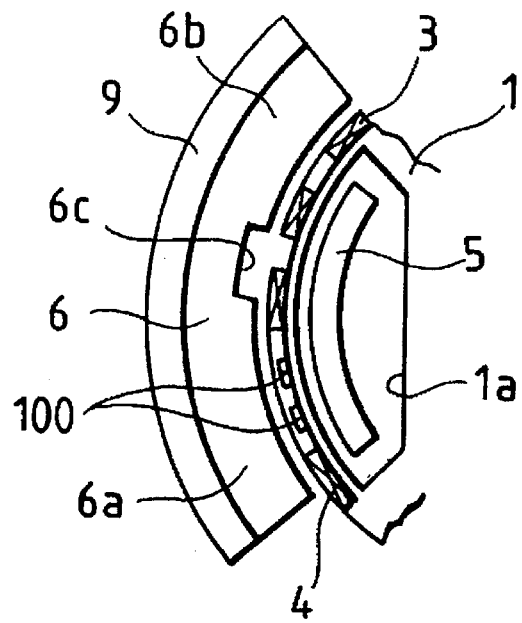
FIG. 13 is a plan view showing enlarged the magnet and coil portions.
Figure 14:
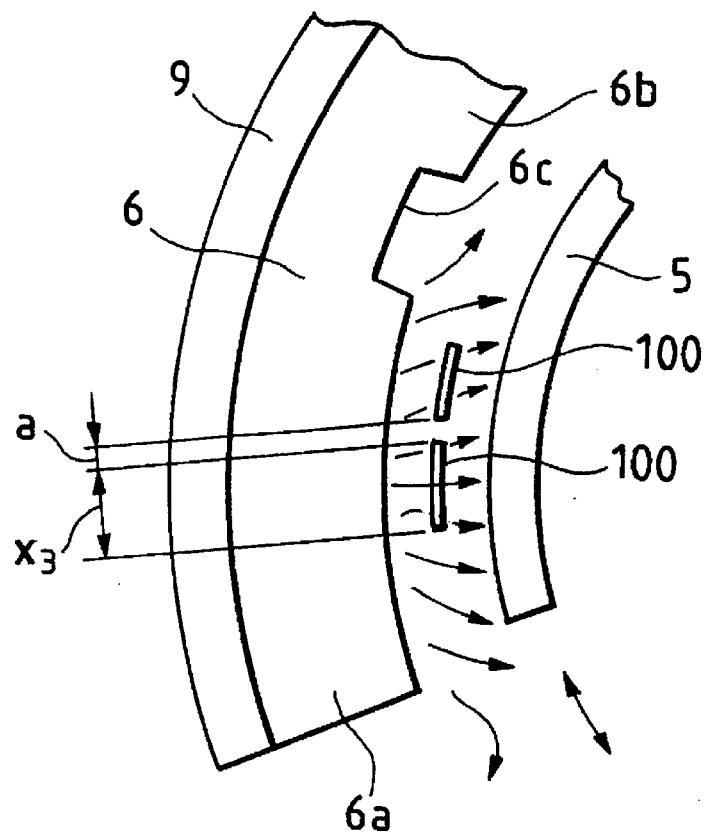
FIG. 14 is a plan view showing the essential part of the objective lens drive unit of the third embodiment together with the flux distribution from one of the magnetic piece portions.
Figure 15:
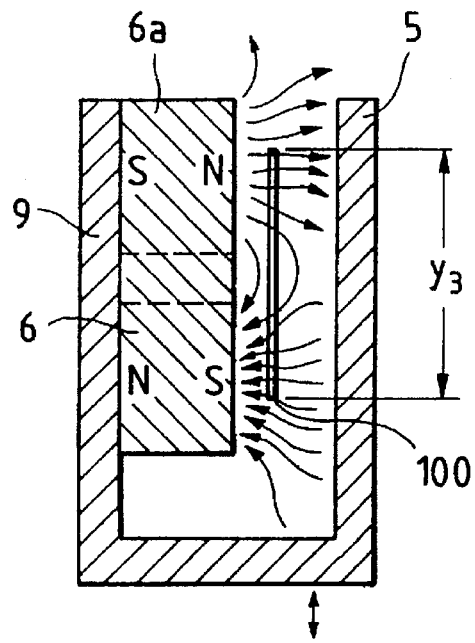
FIG. 15 is a longitudinal section showing the essential part of the objective lens drive unit of the third embodiment together with the flux distribution from one of the magnetic piece portions.

As shown in FIGS. 12 and 13, the outer peripheral portion of each sector of the lens holder 1 has two magnetic pieces 100 secured in positions that face the magnetic pole center of the focusing magnet portion 6a. The magnetic pieces 100 are the characteristic part of the third embodiment of the invention. As described above, the magnetic pieces 100 are spaced apart by given distance a in direction (substantially along the circumference shown in FIG. 14) that is perpendicular to the direction in which the focusing magnet portion 6a is magnetized with polarization. As shown in FIGS. 11, 14 and 15, each of the magnetic pieces 100 is in the form of a thin sheet, with x3 (the width along the circumference of a circle having the fixed shaft 7 at the center) being much smaller than the circumferential dimension of the focusing magnet portion 6a and with y3 (the length along the shaft 7) being also smaller than the axial dimension of the focusing magnet portion 6a. In a typical case, x3=0.5 mm (two thirds of the corresponding dimension of the prior art version), y3=6.4 mm, t3 (the thickness of each magnetic piece 100) =0.1 mm, and a=3.0 mm.

The objective lens drive unit of the third embodiment is operated in the following manner. Let us first describe the basic principles of focusing and tracking operations. When a drive current is supplied through the focusing drive coils 4 shown in FIGS. 12 and 13, the applied current and the flux within the magnetic circuits combine to generate a thrust that causes the lens holder 1 and the objective lens 2 to be moved simultaneously along the optical axis for effecting a focusing operation. When a drive current is supplied through the tracking drive coils 3, the applied current and the flux within the magnetic circuits combine to generate a thrust that causes the lens holder 1 and the objective lens 2 to be moved simultaneously in the tracking direction for effecting a tracking operation.

We next describe the relationship between the flux generated by the focusing magnet portion 6a and the two magnetic pieces 100. The focusing magnet portion 6a is magnetized with polarization along the shaft 7. In a plane that crosses the shaft 7 at right angles, the flux is maximal in the middle part of the gap in the peripheral direction and decreases progressively as it approaches either end of the gap (see FIG. 14). Since the two magnetic pieces 100 are placed within the gap, they are subjected not only to the magnetic attraction created by the focusing magnet portion 6a but also to a restoring force that is comparable to the elastic recovery that will provide a stably holding action at the above-described point where maximum flux occurs. This restoring force allows the lens holder 1 to be held at the peripheral neutral point, whereby the objective lens 2 is held at the neutral point in the tracking direction. The restoring force is proportional to the gradient of the flux distribution and the areas of the two magnetic pieces 100. When the range over which the objective lens 2 can typically move in the tracking direction is considered, the change in the gradient of flux distribution can be approximated by linearity and, hence, the restoring force of interest is created substantially uniformly Over the typical moving range of the objective lens 2.

On the other hand, in a section taken along the shaft 7, the focusing magnet portion 6a is magnetized with polarization in the axial direction and, hence the gradient of flux distribution within the gap containing the magnetic pieces 100 is reversed halfway the path in the vertical direction (see FIG. 15). In the case under consideration, the magnetic pieces 100 work as part of the magnetic path and are magnetically attracted by the central portion of the area magnetized with polarization. This attraction acts as a restoring force that allows the lens holder 1 to be held in a specified position along the shaft 7, whereby the objective lens 2 is held at the neutral point in the focusing direction. As mentioned just above, the magnetic pieces 100 serve as part of the magnetic path of the flux flowing out of the focusing magnetic portion 6a and this offers an added advantage in that the flux density improves, thereby contributing to a higher sensitivity of the objective lens drive unit while insuring that the magnetic restoring force is produced consistently over a wide range.

An experiment with the objective lens drive unit of the third embodiment measures the focusing fo and tracking fo and the results were as follows: the focusing fo increased by a factor of about 1.1 (compared to the conventional value) and the tracking fo increased by a factor of about 2.5 (compared to the conventional value).

Figure 16:
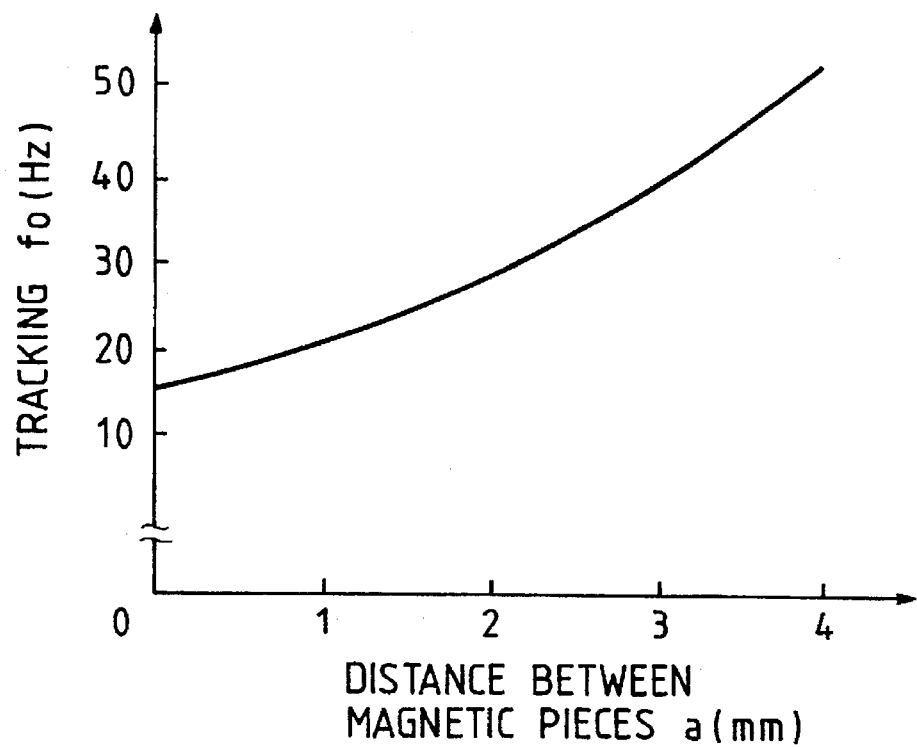
FIG. 16 is a graph showing the tracking fo vs the distance between two magnetic pieces.
Figure 17:
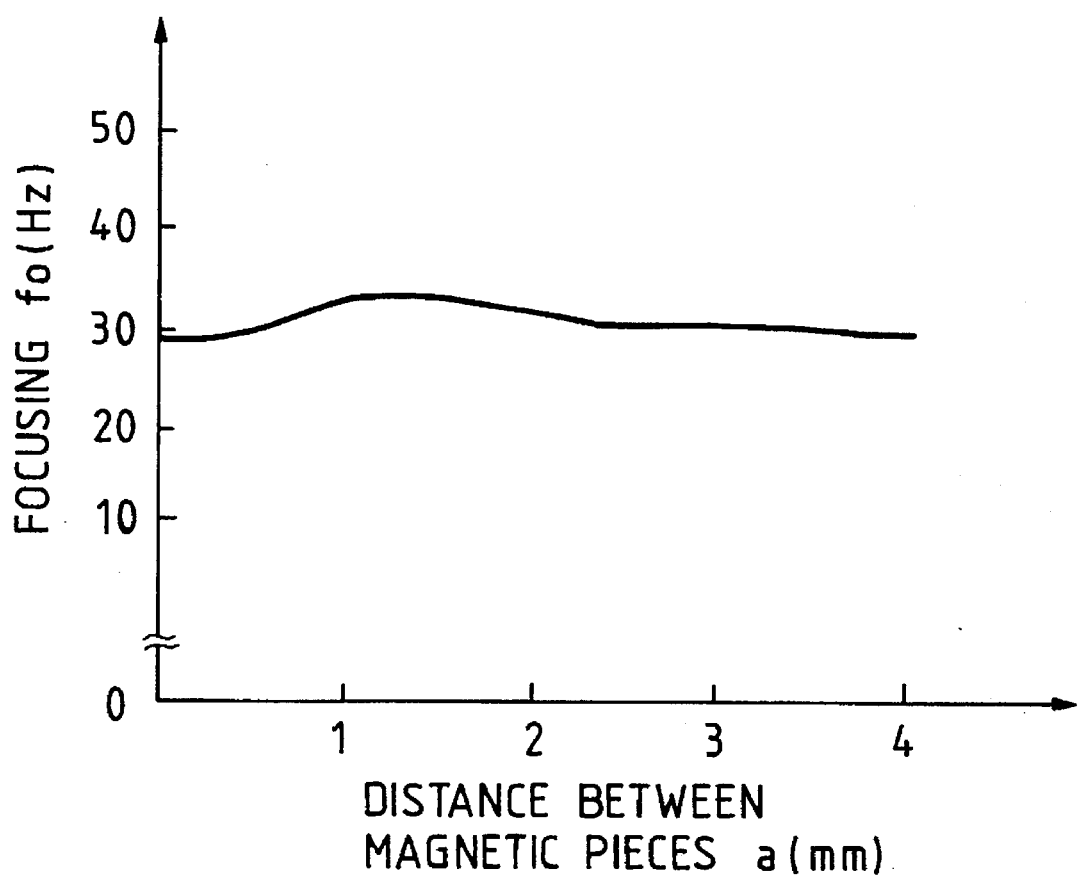
FIG. 17 is a graph showing the focusing fo vs the distance between two magnetic pieces.

Another experiment measures the tracking fo and the focusing fo for varying values of a, the distance between the two magnetic pieces 100, and the results are shown in FIGS. 16 and 17, respectively. As is clear from these figures, the tracking fo increased with the increasing distance a between the magnetic pieces 100 whereas the focusing fo was substantially constant in spite of the increase in the distance a. Thus, by providing two magnetic pieces 100 that are spaced apart in a direction perpendicular to the direction in which the focusing magnetic portion 6a is magnetized with polarization, one can increase the tracking fo while suppressing the changes in the focusing fo; in addition, desired values of tracking fo can be attained by changing the distance a between magnetic pieces 100.

Thus, in the third embodiment where two magnetic pieces 100 are spaced apart in a direction perpendicular to the direction in which the focusing magnet portion 6a is magnetized with polarization, the changes in the focusing fo are suppressed and yet the tracking fo can be enhanced. As mentioned in connection with the prior art, recent models of CO-ROM and other optical disk systems are capable of operation in a quick mode 2 to 4 times as fast as in the normal mode and a growing need has arisen to increase the tracking fo while suppressing the changes in the focusing fo.

This need can be fully met by the objective lens drive unit of the third embodiment and, furthermore, this is accomplished by merely providing two magnetic pieces 100 and, hence, by adopting a very simple construction.

If should also be mentioned that by varying other parameters of the magnetic pieces 100 other than a, such as the width (x3), length (y3) and thickness (t3), further changes can be made to the focusing fo and the tracking fo. Therefore, any desired values of the two resonant frequencies can be attained by adjusting not only a but also x3, y3 or t3. In this way, finer adjustments can be made in the design of the moving part of the objective lens drive unit.

While the present invention has been described above with reference to the third embodiment, it should of course be understood that the invention is by no means limited to this particular embodiment but can be modified in various manners without departing from the scope and spirit of the invention.

Fourth embodiment

A fourth embodiment of the invention will now be described with reference to accompanying drawings. The following description is primarily concerned with the differences from the objective lens drive unit of the first embodiment and the components that are the same as those in the first embodiment are identified by like numerals without any detailed explanation.

Figure 18:
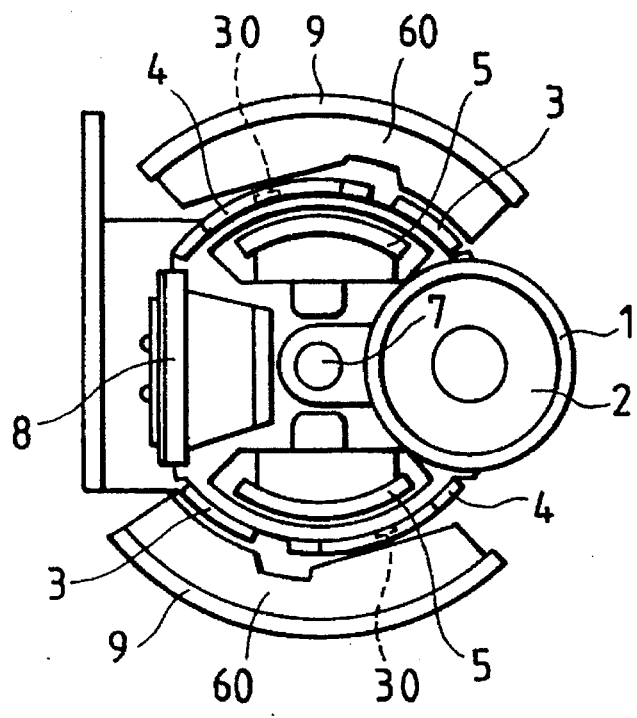
FIG. 18 is a plan view of the objective lens drive unit according to the fourth embodiment of the invention.
Figure 19:
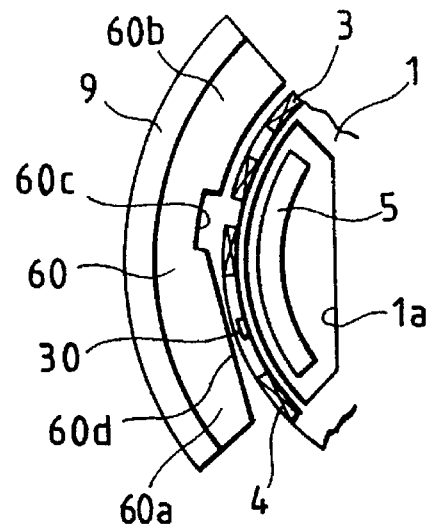
FIG. 19 is a plan view showing enlarged the magnet and coil portions.
Figure 20:
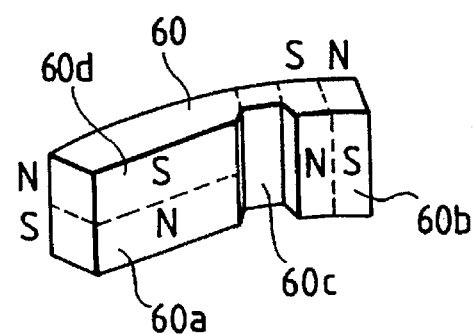
FIG. 20 is a perspective view of the magnet.

As shown in FIGS. 18 and 19, a fixed shaft 7 is pressed into, bonded to or otherwise fixed in a boss 9a that has been formed by burring the center of an outer yoke 9 which serves as a fixing member. The outer yoke 9 is formed as a sector on both sides with the shaft 7 lying in the middle; the outer peripheral portion of the sector is bent up at a right angle in a face-to-face relationship with focusing and tracking drive coils 4 and 3. The rising portions of the outer yoke 9 are formed along arcs of a circle having the shaft 7 at the center, and magnets 60 that are the characteristic part of the fourth embodiment are fixed to the inner surfaces of the rising portions. The magnets 60 are molded as integral parts by a suitable means such as a resin binder. As shown in FIG. 20, each magnet 60 has a groove 60c formed in the middle in a direction parallel to the shaft 7 and consists of a focusing magnet portion 60a and a tracking magnet portion 60b that are formed on opposite sides of the groove 60c. The focusing magnet portion 60a is magnetized with polarization in such a way that N and S poles are formed along the shaft 7. The outer peripheral surface of the magnet portion 60a forms an arc of a circle so that it can be fitted to the inner peripheral surface of the outer yoke 9. In the fourth embodiment, the inner peripheral surface of the magnet portion 60a is made flat so that its clearance from a magnetic piece 30 to be described hereinafter is minimum in the middle part 60d. On the other hand, the tracking magnet portion 60b is magnetized with polarization in a direction perpendicular to the magnetizing direction of the focusing magnet portion 60a so that N and S poles are formed in peripheral direction. Being thusly formed as an integral part, the magnet portions 60a and 60b are mounted on a continuous common surface.

As shown in FIG. 7, each focusing drive coil 4 is formed as a rectangle that is mounted in such a way that the longer sides face the respective magnetic poles of the focusing magnet portion 60a. Each tracking drive coil 3 is also formed as a rectangle but it is mounted in such a way that the longer sides face the respective magnetic poles of the tracking magnet portion 60b.

An inner yoke 5 is placed on top of the outer yoke 9 and secured as referenced to the outside diameter of the boss 9a. Like the outer yoke 9, the inner yoke 5 is formed as a sector on both sides with the shaft 7 lying at the center and the outer peripheral portion of the sector is bent up at a right angle. The rising portions of the inner yoke 5 are formed along arcs of a circle having the shaft 7 at the center. The rising portions penetrate, with good spatial clearance, through windows 1a formed in the top of the lens holder 1 and each of them faces the magnetic portions 60a and 60b with the coils 4 and 3 being interposed. Thus, the inner yoke 5, drive coils 3 and 4, magnets 60 and the outer yoke 9 are arranged on arcs of circle having the shaft 7 at the center and with the inner yoke 5 positioned the innermost (the closest to the shaft 7), thereby forming substantially closed magnetic paths that pass through these members.

Figure 21:
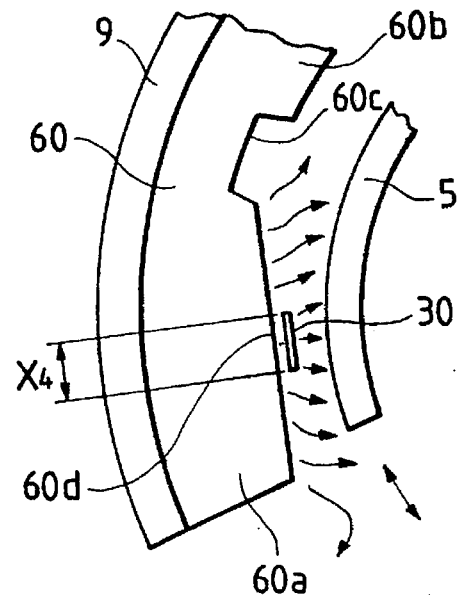
FIG. 21 is a plan view showing the essential part of the objective lens drive unit of the fourth embodiment together with the flux distribution from the magnetic piece portion.

The outer peripheral portion of each sector of the lens holder 1 has a magnetic piece 30 secured in a position that faces the magnetic core center (the middle part) 60d of the focusing magnet portion 60a. As shown in FIGS. 21 and 22, the magnetic piece 30 is in the form of a thin sheet, with x4 (the width along the circumference of a circle having the shaft 5 at the center) being much smaller than the circumferential dimension of the focusing magnet portion 60a and with y4 (the length along the shaft 7) being also smaller than the axial dimension of the focusing magnet portion 60a. It should be noted that the magnetic piece 30 is rectangular.

The objective lens drive unit of the fourth embodiment is operated in the following manner. Let us first describe the basic principles of focusing and tracking operations. When a drive current is supplied through the focusing drive coils 4, the applied current and the flux within the magnetic circuits combine to generate a thrust that causes the lens holder 1 and the objective lens 2 to be moved simultaneously along the optical axis for effecting a focusing operation. When a drive current is supplied through the tracking drive coils 3, the applied current and the flux within the magnetic circuits combine to generate a trust that causes the lens holder 1 and the objective lens 2 to be moved simultaneously in the tracking direction for effecting a tracking operation.

We next describe the relationship between the flux generated by the focusing magnet portion 60a and the magnetic piece 30. The focusing magnet portion 60a is magnetized with polarization along the shaft 7. In a plane that crosses the shaft 7 at right angles, the flux increases in the middle part of the gap in the peripheral direction and decreases progressively as it approaches either end of the gap (see FIG. 21). Furthermore, in the fourth embodiment where the magnetic piece 30 is placed in position that faces the middle part 60d of the focusing magnet portion 60a which has a flat inner peripheral surface, the distance between this inner peripheral surface and the magnetic piece 30 is minimal in that position, where a maximum flux density will accordingly develop.

As a result, the magnetic piece 30 is subjected not only to the magnetic attraction created by the focusing magnet portion 60a but also to a restoring force that is comparable to the elastic recovery that will provide a stably holding action in the above-described point where the maximum flux density develops. This restoring force allows the lens holder 1 to be held at the above-mentioned position in the peripheral direction (i.e., the position where the magnetic piece 30 faces the middle part 60d of the focusing magnet portion 60a).

In the fourth embodiment, the above-stated position, namely, the position where the distance between the inner peripheral surface of the focusing magnet portion 60a and the magnetic piece 30 is minimal, coincides with the design neutral point in the tracking direction ("stationary neutral position"). In that position, the magnetic attraction working on the magnetic piece 30 is great enough to insure that the adverse effects of imbalanced flux, leakage flux, variations in workmanship and other factors can be safely neglected and this permits the objective lens 2 to be held stably in that position.

The above-described design in which the distance to the magnetic piece 30 is made the shortest in the middle part 60d of the focusing magnet portion 60a offers the added advantage of allowing the flux density from the magnet portion 60a to be concentrated in the middle part, thereby making it possible to increase the tracking fo while suppressing the changes in the focusing fo.

It should be added that the restoring force described above is proportional to the gradient of the flux distribution and the area of the magnetic piece 30. When the range over which the objective lens 2 can typically move in the tracking direction is considered, the change in the gradient of flux distribution can be approximated by linearity and, hence, the restoring force of interest is created substantially uniformly over the typical moving range of the objective lens 2.

On the other hand, in a section taken along the shaft 7, the focusing magnet portion 60a is magnetized with polarization in the axial direction and, hence, the gradient of flux distribution within the gap containing the magnetic piece 30 is reversed halfway the path in the vertical direction (see FIG. 22). In the case under consideration, the magnetic piece 30 works as part of the magnetic path and is magnetically attracted by the central portion of the area magnetized with polarization. This attraction works as a restoring force that allows the lens holder 1 to be held in a specified position along the shaft 7, whereby the objective lens 2 is held at the neutral point in the focusing direction. As mentioned just above, the magnetic piece 30 serves as part of the magnetic path of the flux flowing out of the magnet portion 60a and this offers an added advantage in that the flux density improves, thereby contributing to a higher sensitivity of the objective lens drive unit while insuring that the magnetic restoring force is produced consistently over a wide range.

The fundamental concept of the fourth embodiment is also applicable in the focusing direction and the axial distance between the focusing magnet portion 60a and the magnetic piece 30 may be rendered the closest at the design neutral point in the focusing direction ("stationary neutral position"). By doing this, the objective lens 2 can be allowed to rest in that neutral position as stably as in the tracking mode.

While the present invention has been described above specifically with reference to the fourth embodiment, it should of course be understood that the invention is by no means limited to that particular embodiment but can be modified in various manners without departing from the scope and spirit of the invention in the fourth embodiment, the magnetic piece 30 is positioned. In a face-to-face relationship with the focusing magnet portion 60a; as long as the structural design characteristic of the fourth embodiment is adopted, the magnetic piece 30 may be positioned in a face-to-face relationship with the tracking magnet portion 60b or with both the focusing magnet portion 60a and the tracking magnet portion 60b.

In the fourth embodiment, the focusing magnet portion 60a is made flat on the side facing the magnetic piece 30 to insure that the distance to the magnetic piece 30 is minimal in the middle part 60d and, at the same time, the magnetic piece 30 is provided on the driven side and the magnet 60 on the fixed side. It should, however, be noted that the invention is in no way limited to this particular case and various modifications can be made as long as the distance between the magnetic piece and the magnet is the closest in the design neutral position.

In the objective lens drive unit according to the first embodiment of the invention, at least one end portion of the magnetic piece in the polarizing direction is adjusted to have a greater width than the central portion and, as a result, the flux through the magnetic piece that will contribute to the production of a restoring force in the focusing direction is suppressed by the constricted central portion whereas the volume of the magnetic piece that will contribute to the production of a restoring force in the tracking direction is increased. This permits the tracking fo to be increased with the length of the magnetic piece being adjusted to be equal to or smaller than the conventional value. Hence, the objective lens drive unit of the first embodiment is capable of increasing the tracking fo while maintaining the linearity of its characteristics at a satisfactory level and it yet can be manufactured in a smaller thickness.

In the second embodiment, at least one end portion of the magnetic piece in the polarizing direction is adjusted to have a greater thickness than the central portion and, hence, as in the first embodiment, the objective lens drive unit is capable of increasing the tracking fo while maintaining the linearity of its characteristics at a satisfactory level and it yet can be manufactured in a smaller thickness.

In the third embodiment, two magnetic pieces are spaced apart in a direction perpendicular to the direction in which the focusing magnet portion is magnetized with polarization and, hence, the changes in the focusing fo are suppressed and yet the tracking fo can be enhanced. This makes it possible to meet the need for increasing the tracking fo while suppressing the changes in the focusing of, which is the requirement of recent models of CD-ROM and other optical disk systems which are capable of operation in a quick mode 2 to 4 times as fast as in the normal mode.

In the fourth embodiment, the position where the distance between the magnetic piece and the magnet is the closest coincides with the design neutral point; therefore, in that position, the magnetic attraction working on the magnetic piece is great enough to insure that the adverse effects of imbalanced flux, leakage flux, variations in workmanship and other factors can be safely neglected and this permits the objective lens to rest stably in that position.

If the distance to the magnetic piece is made the shortest in the central part of the magnet in the peripheral direction, this offers the added advantage of allowing the flux density from the magnet to be concentrated in the middle part, thereby making it possible to increase the tracking fo while suppressing the changes in the focusing fo.

What is claimed is:

1. An objective lens drive device comprising:

an objective lens holder;

a fixing member;

drive coils mounted on one of the objective lens holder and the fixing member;

magnets mounted on the other one of the objective lens holder and the fixing member, the magnets positioned in face-to-face relationship with the drive coils, the drive coils being supplied with an electric current so as to drive the lens holder in both a focusing direction and a tracking direction, at least one of said magnets being magnetized in a polarizing direction that is substantially parallel to the focusing direction; and magnetic pieces disposed on said one of the objective lens holder and the fixing member in magnetic circuits of said at least one of said magnets, wherein a two-dimensional restoring force is generated in the focusing direction and the tracking direction by magnetic attraction acting on the magnetic pieces so that said objective lens holder is held at a design stationary neutral position, wherein when said objective lens holder is held at said design stationary neutral position, a gap between the magnetic pieces and the magnets is smaller than the gap at all other positions of the magnetic pieces relative to the magnets in the tracking direction.

2. An objective lens drive unit according to claim 1, wherein the magnetic pieces are mounted on the objective lens holder so as to move in a peripheral direction during tracking, and the magnets are mounted on the fixing member in a face-to-face relationship with peripheral outer surfaces of the magnetic pieces and have a flat circumferential surface facing the magnetic pieces.

3. An objective lens drive device as recited in claim 1, wherein at least one end portion of the magnetic pieces in said polarizing direction is wider than a middle portion of the magnetic pieces.

4. An objective lens drive device as recited in claim 1, wherein at least one end portion of the magnetic pieces in said polarizing direction is thicker than a middle portion of the magnetic pieces.

* * * * *